US012611888B2

(12) United States Patent
Barberan Latorre

(10) Patent No.: US 12,611,888 B2
(45) Date of Patent: Apr. 28, 2026

(54) METHOD AND SYSTEM FOR PRODUCING A RELIEF ON A SUBSTRATE

(71) Applicant: Jesus Francisco Barberan Latorre, Castelldefels (ES)

(72) Inventor: Jesus Francisco Barberan Latorre, Castelldefels (ES)

( * ) Notice: Subject to any disclaimer, the term of this patent is extended or adjusted under 35 U.S.C. 154(b) by 180 days.

(21) Appl. No.: 18/245,777

(22) PCT Filed: Sep. 27, 2021

(86) PCT No.: PCT/ES2021/070697

§ 371 (c)(1),
(2) Date: Mar. 17, 2023

(87) PCT Pub. No.: WO2022/069777

PCT Pub. Date: Apr. 7, 2022

(65) Prior Publication Data

US 2023/0331031 A1 Oct. 19, 2023

(30) Foreign Application Priority Data

Oct. 2, 2020 (EP) .................................... 20382877

(51) Int. Cl.
*B44C 1/22* (2006.01)
*B41M 5/00* (2006.01)
*B44C 5/04* (2006.01)

(52) U.S. Cl.
CPC ............ *B44C 1/22* (2013.01); *B41M 5/0047* (2013.01); *B44C 5/04* (2013.01)

(58) Field of Classification Search
None
See application file for complete search history.

(56) References Cited

U.S. PATENT DOCUMENTS

2003/0138555 A1* 7/2003 Debe .......................... H01J 7/24
427/152
2010/0092688 A1 4/2010 Serbutoviez et al.
2014/0196618 A1 7/2014 Pervan et al.

FOREIGN PATENT DOCUMENTS

EP 3109056 A1 12/2016
EP 3381710 A1 10/2018
KR 20030009252 A 1/2003

OTHER PUBLICATIONS

International Search Report and Written Opinion for Corresponding International Application No. PCT/ES2021/070697, 11 pages, Jan. 26, 2022.
European Search Report for Corresponding European Patent Application No. EP 20382877, 8 pages, Mar. 31, 2021.

* cited by examiner

*Primary Examiner* — Joshua D Zimmerman
(74) *Attorney, Agent, or Firm* — LUCAS & MERCANTI, LLP

(57) ABSTRACT

A method and system for producing a relief on a substrate (1), the method having the application on the substrate (1) of a coating and a relief product that come into contact with each other and the sublimation of the relief product (3).

36 Claims, 13 Drawing Sheets

METHOD AND SYSTEM FOR PRODUCING A RELIEF ON A SUBSTRATE

CROSS REFERENCE TO RELATED APPLICATION

This Application is a 371 of PCT/ES2021/070697, filed on Sep. 27, 2021, which claims the benefit of European Patent Application No. 20382877.7, filed on Oct. 2, 2020, each of which are incorporated herein by reference.

TECHNICAL FIELD

The present invention relates to a method and a system for producing a 3D surface relief or structure on a substrate, in particular by means of digital inkjet printing.

The invention is particularly applicable in the field of the manufacture of products for construction and furniture, such as panels for furniture, doors and floors, profiles for door and window frames, etc.

The production of reliefs on substrates makes it possible to reproduce haptic textures or surfaces of natural materials, such as wood or stone, in correspondence with images printed on the substrate.

STATE OF THE ART

At present, different techniques are known for producing reliefs on substrates by means of digital inkjet printing. These techniques have the advantage that they enable reliefs to be obtained with much greater flexibility and precision compared to other known techniques for producing reliefs on substrates such as engraving or moulding.

In known techniques for producing reliefs on substrates by means of digital inkjet printing, droplets of a relief product are printed on a coating. The printed droplets generate a positive surface or projections on the coating, by adding relief product to the coating. Alternatively, the printed droplets generate a negative surface or recesses in the coating, by impact, immiscibility or displacement of the droplets of relief product injected into the liquid coating, or, once the relief product has been mixed or dissolved with the coating, when removing the mixed material or solution.

The production of positive surfaces by means of digital inkjet printing has the drawback of the limited resistance to abrasion of the relief obtained. Moreover, the production of negative surfaces by means of digital inkjet printing has the drawback of the difficulty of controlling the process to obtain an adequate definition of the reliefs due to the existence of complex physical and chemical mechanisms of interaction between the droplets of relief product and the coating. Different variables intervene in these mechanisms such as the surface tension, density and viscosity of the relief product or the coating, as well as the speed and volume of the droplets of relief product.

In view of the currently known solutions, the present invention aims to provide an alternative method and system for producing reliefs on substrates that enables reliefs to be obtained that have adequate abrasion resistance and definition of the reliefs in a flexible manner.

OBJECT OF THE INVENTION

In order to meet this objective and solve the technical problems discussed so far, in addition to providing additional advantages that may be derived later, the present invention provides a method for producing a relief on a substrate that comprises the application on the substrate of a coating and a relief product, the coating and the relief product coming into contact with each other, and the sublimation of the relief product.

In general, any product capable of sublimation can be used as a relief product. In particular, so-called sublimation or sublimatable inks, commercially available for other known uses, such as screen printing, can be used. In particular, it is envisaged that the relief product is transparent, which enables a noticeable relief to be obtained with a clean finish, which does not require the removal of stains of relief product.

The relief product, in solid state, is sublimated, leaving gaps in the coating that correspond to the areas occupied by the relief product in contact with the coating, the gaps determining the relief.

According to the invention it is envisaged that the coating and/or the relief product is solidified during the process, being supplied to the process in a liquid state. The solidification of the relief product and/or the coating according to the invention can be carried out, for example, by means of curing or drying.

According to the invention the relief product can be applied by means of digital inkjet printing, injecting ink in the form of droplets of relief product. This enables reliefs to be produced with great flexibility, speed and definition typical of digital inkjet printing technology.

Given that the relief product is in a solid state to carry out the sublimation, the relief is conditioned by variables of the sublimation process itself and to a lesser extent by the different variables of interaction indicated above between the relief product and the coating, especially when the relief product is applied by means of digital inkjet printing. In this way, it is possible to obtain reliefs with high definition in a controlled manner.

Preferably, according to the invention, the coating and the relief product come into contact with each other when the coating is liquid or partially solidified, especially if the relief product is applied by means of digital inkjet printing. This facilitates the introduction of the relief product into the coating, for example by impact, immiscibility or displacement, or the mixing or dilution of the relief product in the coating. In this sense, according to the invention the ability to produce reliefs by means of sublimation is compatible with known relief production techniques and can be used in combination with them.

The invention envisages both that the relief product to be sublimated is at least partially covered by or embedded in the coating and that the relief product to be sublimated is at least partially mixed with the coating. As the relief product is sublimated and thus changes from a solid to a gas, the relief product volatilises towards the outside of the coating.

As the relief product gas makes its way through the coating during sublimation, a porous or hollow volume is generated in the coating. This porous volume of the coating affected by the sublimation is easily removable due to the brittleness thereof with respect to the volume of the coating that has not been penetrated by the sublimated relief product gas. The relief can be obtained by removing the coating material affected by the sublimation. It is also envisaged that after sublimation a residue of relief product may be removed, in particular with the coating material affected by the sublimation. The removal of material can be carried out, for example, with mechanical means such as brushing or vacuuming and/or chemical means such as washing or rinsing.

Preferably, according to the invention, the coating finishes solidifying later than the relief product. Thereby facilitating the evacuation of the sublimated relief product gas through the coating. To achieve said delay in the solidification of the coating with respect to the relief product, the material of the relief product and/or the coating can be selected with a suitable composition that influences, for example, the curing or drying thereof.

According to the invention, the relief can be applied in a coordinated manner or in correspondence with an image on the substrate, which is applied to the substrate before or after producing the relief. The production of the relief and the corresponding image can be synchronously carried out by means of digital inkjet printing of the relief and the image.

Preferably, the invention envisages both that the relief product is applied on the coating, i.e., once the coating is applied, and that the coating is applied on the relief product, i.e., once the relief product is applied. However, any other variant wherein the relief product and the coating are on the substrate making contact with each other is also envisaged such as, for example, being simultaneously applied, in particular, mixed, forming one same application product. According to the invention, the coating and/or the relief product can be applied by extending it at least by areas, i.e., covering the substrate at least partially or in partial areas.

Likewise, the present invention envisages that the relief product and the coating can be applied successively to obtain a plurality of layers of coating and relief product, thus forming a multilayer coating. In this case, the sublimation of the relief product can be carried out after applying the respective layer and before applying the next and/or after applying all the layers. Each layer can be configured with different parameters such as, for example, layer thickness, relief product volume, sublimation ink droplet volume, etc.

In this regard, the present invention also envisages that other layers may additionally be applied which extend at least partially covering the substrate, so that multilayer coatings can be obtained, with at least one coating and relief product layer, as well as at least another decorative or functional layer, for example, with different degrees of gloss or structures with different depths. These other layers can be applied, for example, between layers of coating and relief product and/or on said layers. Likewise, the coating and relief product layers themselves can be additionally provided, at least partially, with decorative or functional features, for example, different degrees of gloss or structures with different depths.

In this manner, by selectively applying the coating and/or relief product in partial areas, applying them successively or including other layers, multilayer coatings can be obtained wherein different decorative or technical effects such as different glosses or reliefs can be selectively controlled or provided.

In the context of the present invention, relief product can therefore be understood as a product that, applied in contact with the coating, is configured according to the invention to produce a relief in the coating when being at least partially sublimated. In this sense, the relief product applied comprises at least partly sublimatable product, i.e., made of a sublimatable material, which to produce the relief in the coating by means of the method of the invention is at least partially sublimated.

According to the invention, it is envisaged that the coating and/or the relief product are applied in liquid or solid form. The relief product in solid state can be applied, for example, by spreading solid relief product powders. The relief product in solid state can be applied, for example, in the form of a solid sheet that extends on the substrate. In this sense, the invention envisages any possible combination with respect to the use of relief product and/or coating in at least partially liquid or solid state.

Preferably, the relief product is applied in liquid form by means of digital inkjet printing, for example, using a sublimation ink, in particular, as previously indicated a sublimation ink of the ones used for screen printing, adapted to the method according to the invention. Likewise, preferably, the coating is applied in liquid form by means of a roller. However, it is also envisaged that both the coating and the sublimation ink or liquid contained by liquid relief products can be applied by means of any other method in addition to by inkjet or by roller, such as by spraying.

It is envisaged that the sublimation is carried out by heating the relief product, preferably at atmospheric pressure. Preferably, in the case that the relief product is applied by means of an inkjet sublimation ink, the sublimation temperature of the selected sublimatable product must be higher than a minimum threshold, taking into account that the inkjet heads used are heated to achieve suitable injection viscosities (typically at approximately 40° C.). Likewise, preferably, the sublimatable product must be selected so that the sublimation temperature thereof is lower than a maximum threshold, for example, 200° C., to prevent the degradation of materials that intervene in the method such as, for example, the coating or the substrate.

The sublimation of the relief product can be carried out by heating in any manner, by means of radiation, convention or thermal conduction, in particular, by using respectively a source of electromagnetic radiation (for example, by IR), a thermal convection element (for example, heated air), and/or a thermal conduction element (for example, a heated element). In particular, IR lamps can be used as sources of electromagnetic radiation for heating.

According to a preferred embodiment according to the invention, it has been provided that the sublimation ink, or liquid contained by the relief product, is a dispersion wherein the dispersed portion comprises the relief product. In particular, the dispersed portion can be in liquid or solid form.

Also preferably, it has been provided that the relief product has a concentration of sublimation ink, or liquid for applying the relief product, when being applied less than or equal to 10% by weight, preferably less than or equal to 1% by weight, in particular less than or equal to 0.1% by weight. In this manner, with relatively low concentrations of relief product enough hollows determining the relief in the coating can be obtained.

Likewise, preferably, the relief product comprises sublimatable solid particles, i.e., made of a sublimatable material. Normally, the sublimatable solid particles can be of any size. Advantageously, a particle size (D50) smaller than or equal to approximately 2000 Å enables the use thereof in inkjet printing heads that do not require recirculating. The smaller the sublimatable particle size, the greater the amount of sublimatable material than can be sublimated, particle sizes (D50) smaller than or equal to approximately 100 Å being especially suitable. Particularly, with particle sizes (D50) smaller than or equal to approximately 10 Å, a solution of relief product in the sublimation ink or liquid for applying the relief product can be obtained. The term D50 for quantifying the average size of the particles, also known as mean diameter, is defined in a manner known to the person skilled in the art, i.e., as the particle diameter value for which the concentration of particles of greater or lesser diameter than said value is 50% of the total particle distribution in a sample.

As previously mentioned, it is advantageously envisaged that the relief product and/or the sublimation ink, or application liquid, are miscible in the coating. In this manner, when the relief product or sublimation ink are being applied, they can be easily introduced into the coating, which facilitates the greater contact with each other to generate the hollows determining the relief in the sublimation. To favour miscibility, it is envisaged that the sublimation ink and the coating have substantially one same polarity; in particular, the coating and the dispersing portion of the sublimation ink have substantially the same composition.

The mechanism of mixing the sublimation ink and the coating, in particular by means of inkjet, makes it possible to obtain a higher definition of the relief, compared to other known relief production mechanisms wherein a displacement of the coating liquid occurs which determines the hollows of the relief by means of the liquid of the injected ink (for example, by impact of the droplet on the coating surface). This higher definition obtained can be due to the fact that the displacement mechanism entails a local deformation around the hollow or indentation in the coating, where the liquid that has been displaced or dislodged from said hollow accumulates, unlike the mixture wherein there is no such displacement, but rather the relief product is incorporated in the coating, the relief being obtained by removing said mixture in a subsequent step or station.

Additionally, the present invention provides an improved definition as a result of the fact that the relief product is confined by its own solid condition, unlike the liquids, since the relief product to be sublimated is in a solid state to generate the hollows that determine the relief during the sublimation. This makes the present invention to be especially suitable for use thereof also in a complementary manner with other known methods for obtaining reliefs on substrates.

According to a preferred embodiment, the relief product and/or the sublimation ink, or application liquid of the relief product, comprise an electromagnetic radiation absorbing agent, configured to substantially absorb electromagnetic radiation energy irradiated in a determined wavelength, in particular, electromagnetic radiation for curing the coating and/or the relief product, transforming said energy into heat. As electromagnetic UV radiation absorbing agent, benzophenones, benzotriazoles, triazines, oxanilides and cyanoacrylates can be used for example. In particular, LED-type or arc discharge UV lamps can be used as sources of electromagnetic radiation.

According to another preferred embodiment, the relief product and/or the sublimation ink, or application liquid of the relief product, can comprise an exothermic chemical reaction promoting agent, configured to react in the coating by releasing heat. With these two last embodiments according to the invention, the efficiency of the heating for producing the sublimation is increased.

The present invention also envisages that the sublimation ink, or application liquid of the relief product, comprises an odoriferous agent configured to permeate the coating (2) with odour when activated, for example, by heating. The relief product itself can comprise said odoriferous agent or, in particular, constitute the same (for example, camphor can be used as a sublimatable and odoriferous product). The sublimation enables the odours to be extracted to the surface, at the same time guaranteeing that the odour is retained in the coating, permeating the same.

Likewise, according to the invention, the sublimation ink can be transparent or contain pigments, as well as other functional particles. The incorporation of pigments or functional particles in the sublimation ink, or application liquid, enables the features of the relief to be obtained to be linked to the features provided with the pigments or functional particles at each application point, for example, with each droplet of inkjet ink application. In this manner, a coordination of the relief to be obtained with the decorative or functional effect provided by said pigments or particles is achieved, in the same step or station of application of the sublimation ink, or application liquid.

As mentioned above, according to the invention the coating and/or the relief product can be solidified to obtain the relief, in particular, they can be solidified at least partially before sublimating the relief product. Preferably, the solidification of the coating and/or the relief product is carried out by curing or polymerisation, preferably by electromagnetic radiation, more preferably, by UV. To do this, the coating or the relief product are made of a curable or polymerisable material. In particular, LED-type or arc discharge UV lamps can be used as sources of electromagnetic radiation.

A partial solidification of the coating, i.e., a delimited degree of solidification or curing, before sublimation, makes it possible to obtain a higher definition of the relief, as it allows to fix in a certain way the contour determining the relief retaining in said contour the relief product to be sublimated. Particularly, the coating ends up solidifying later than the relief product. In this manner, the relief product does not tend to get encapsulated, preventing the gas from not being able to be evacuated to the surface.

Also as previously indicated, according to an embodiment of the method according to the invention, the relief is obtained by removing coating affected by the sublimation of the relief product and/or a residue of relief product. This removed material is determined by the hollows left in the coating after the sublimation. In this sense, in the context of the invention, residue of relief product can be understood as relief product that is transformed or not after applying the sublimation step of the method according to the invention, in particular, relief product that is not sublimated after applying the sublimation step.

The second aspect of the invention provides a system for producing a relief on a substrate. According to the invention, the system comprises means for applying coating to the substrate, means for applying relief product, means for sublimating relief product, and means for controlling the means for applying coating, the means for applying relief product and the means for sublimating. The system is configured for carrying out the method as described above.

The system may comprise means for removing material to produce the relief, which may be, for example, mechanical such as brushing or vacuuming and/or chemical such as washing or rinsing. It is also envisaged that the system includes means for vacuuming the relief product gas that is generated during the sublimation.

Likewise, the system may include transport means, which comprise, for example, a conveyor belt, to transport the substrate between the different stations wherein the corresponding steps of the method are carried out as described above.

The means for sublimating the relief product according to the invention are envisaged to preferably be by heating. To do this, thermal radiation heating means can be used, for example, comprising at least one electromagnetic radiation heating lamp, in particular, an IR heating lamp. Alternatively or complementarily, thermal convection heating means can be used, for example, by means of heated air, in particular with a heated air blower. Also alternatively or complementarily, thermal conduction heating means can be used, for example, by means of a thermal conduction heating element, in particular a heated roller or plate.

According to a preferred embodiment according to the invention, the system comprises a reception element, in particular in the form of a reception strip, for sublimating material that faces the coating, so that, when the relief product is sublimated, sublimation material formed by coating affected by the sublimation of the relief product and/or a residue of the relief product is projected onto the reception strip. This reception element, preferably in the form of a strip, enables said sublimation material to be transferred from the coating adhering to the element to facilitate the subsequent evacuation of the sublimation material.

According to the invention, it is also envisaged that the system may comprise means for cleaning a surface of the thermal conduction heating element or of the reception element on which the sublimation material is projected, in particular comprising a scraping blade for scraping said surface or reception element.

Likewise, as indicated above, the system may comprise means for removing sublimation material from the coating to produce the relief. These means can be, in particular, in the form of at least one brush, at least one vacuum and/or at least one blower. It is also envisaged that the system may comprise means for extracting gas from the sublimation of the relief product, in particular in the form of a gas extraction hood. It is also envisaged that the system may comprise solidification means to solidify at least partially the coating and/or the relief product.

DESCRIPTION OF THE FIGURES

The following figures are included that serve to illustrate different practical embodiments of the invention that are described below by way of example but not limitation.

DETAILED DESCRIPTION OF THE INVENTION

The substrates (1) can be configured by way of panels or profiles. The material of the substrates (1) can be selected, for example, from wood (chipboard, medium-density fibreboard "MDF", high-density fibreboard "HDF" or plywood), plastic (PVC), cellulose-based materials (paper or cardboard) or metal.

The coating (2) can be applied in liquid state by any method for applying liquid products, for example, by roller, sprinkling, spraying or inkjet printing. The material of the coating (2) can be selected, for example, between varnish or polymerisable resin.

In the embodiments of the invention that are shown in the figures and described in detail below, the relief product (3) is digitally inkjet-printed, being applied in the form of droplets of sublimation ink.

Figure 1:
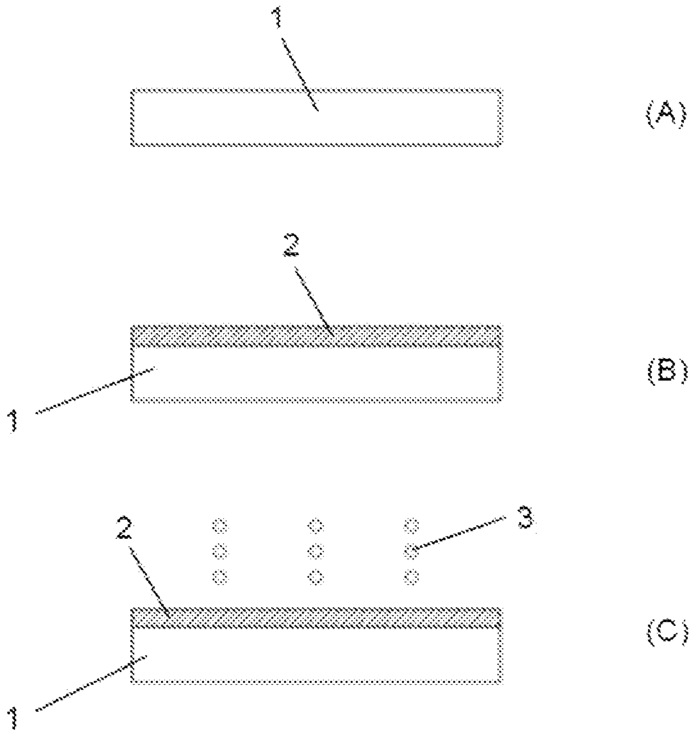
FIG. 1 schematically shows the cross section of a substrate on which a relief is obtained, in steps (A) to (C) according to a first embodiment of the method or system of the invention.
Figure 2:
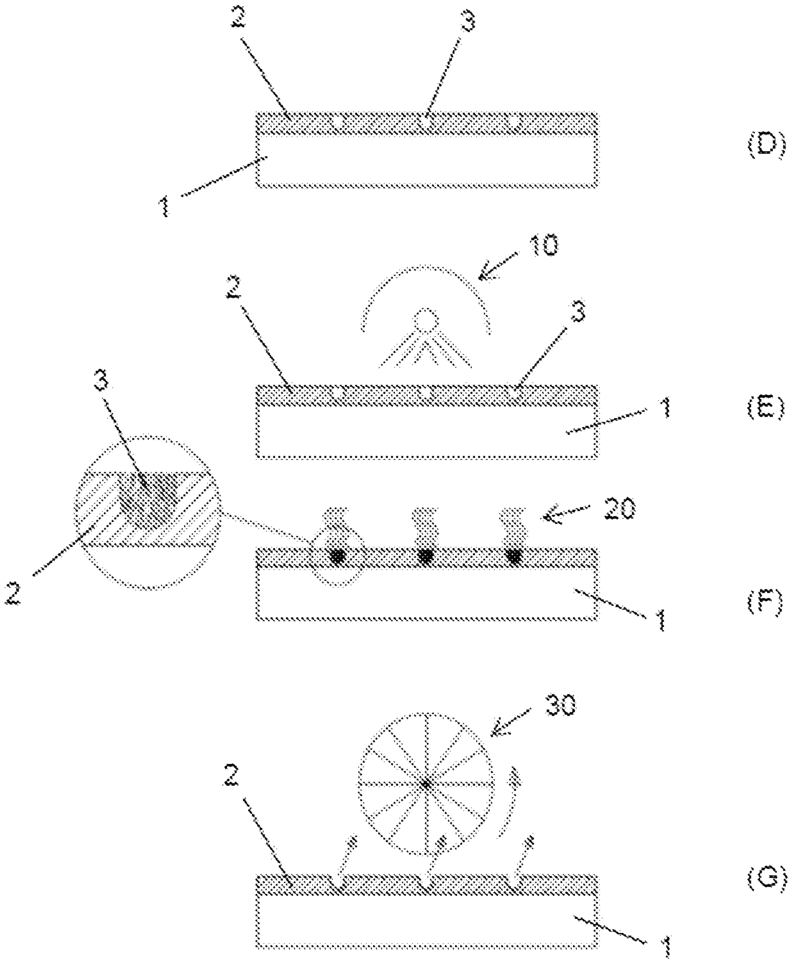
FIG. 2 schematically shows the cross section of a substrate on which a relief is obtained, in steps (D) to (G) according to a first variant of the first embodiment of the method or system of the invention.
Figure 3:
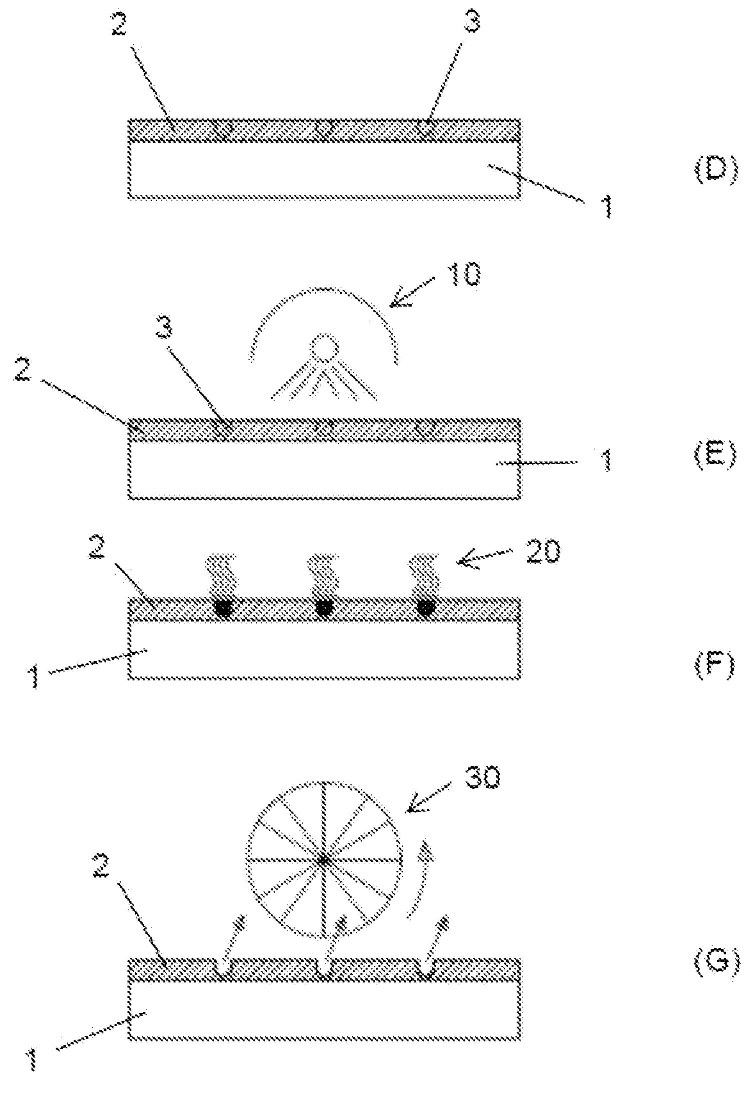
FIG. 3 schematically shows the cross section of a substrate on which a relief is obtained, in steps (D) to (G) according to a second variant of the first embodiment of the method or system of the invention.

According to a first embodiment of the invention shown in FIGS. 1 to 3, the starting point is a substrate (A) on which a coating (2) is applied (B), the relief product (3) being applied (C) on the coating (2).

Figure 4:
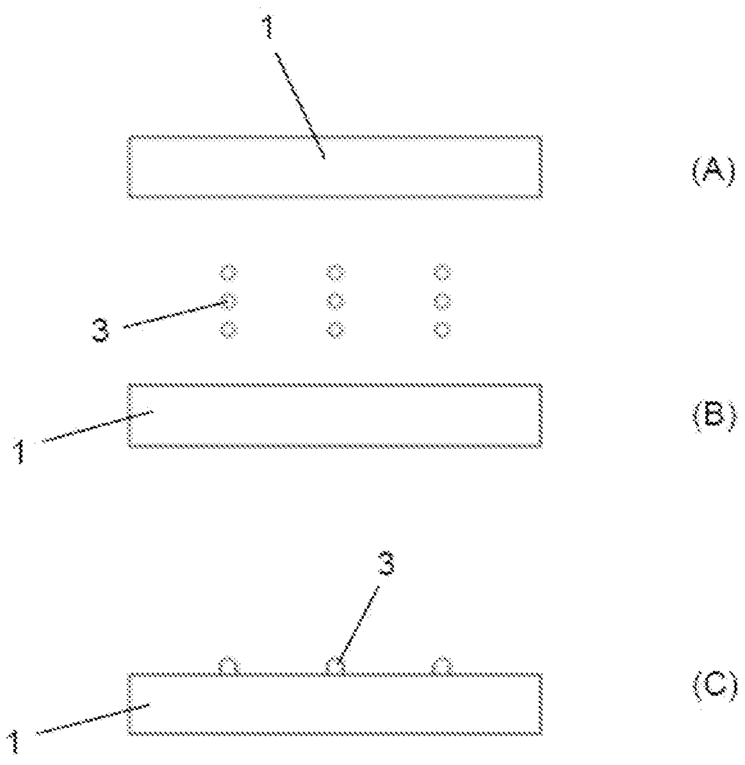
FIG. 4 schematically shows the cross section of a substrate on which a relief is obtained, in steps (A) to (C) according to a second embodiment of the method or system of the invention.
Figure 5:
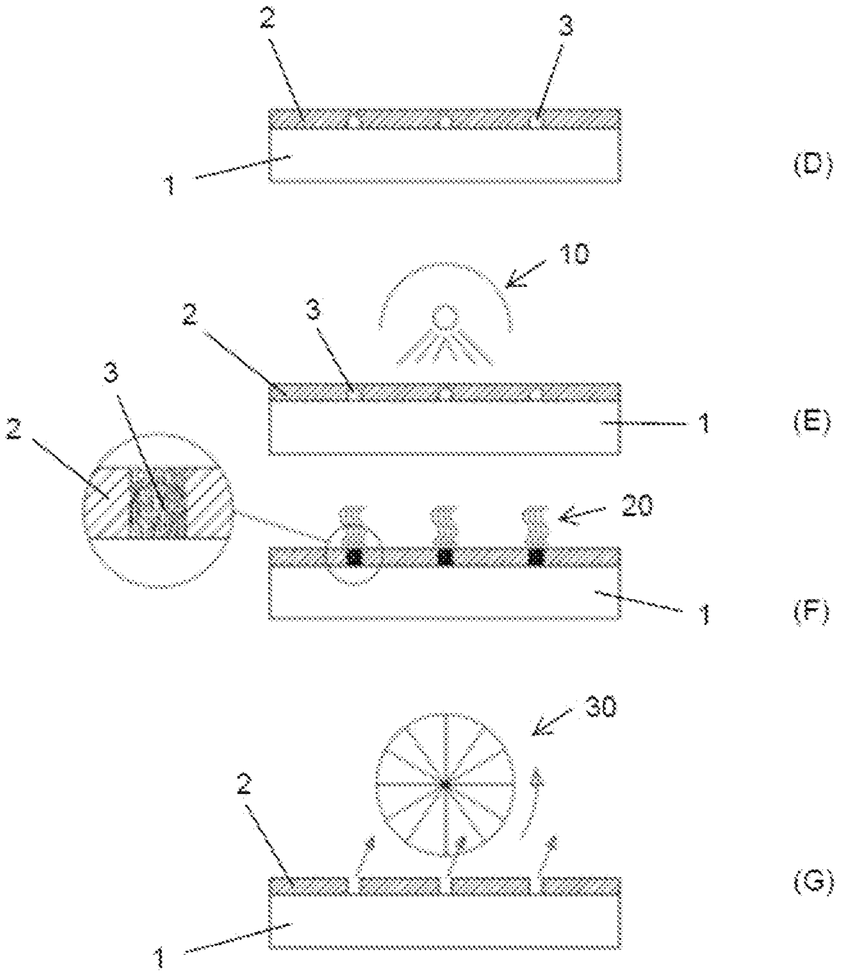
FIG. 5 schematically shows the cross section of a substrate on which a relief is obtained, in steps (D) to (G) according to a first variant of the second embodiment of the method or system of the invention.
Figure 6:
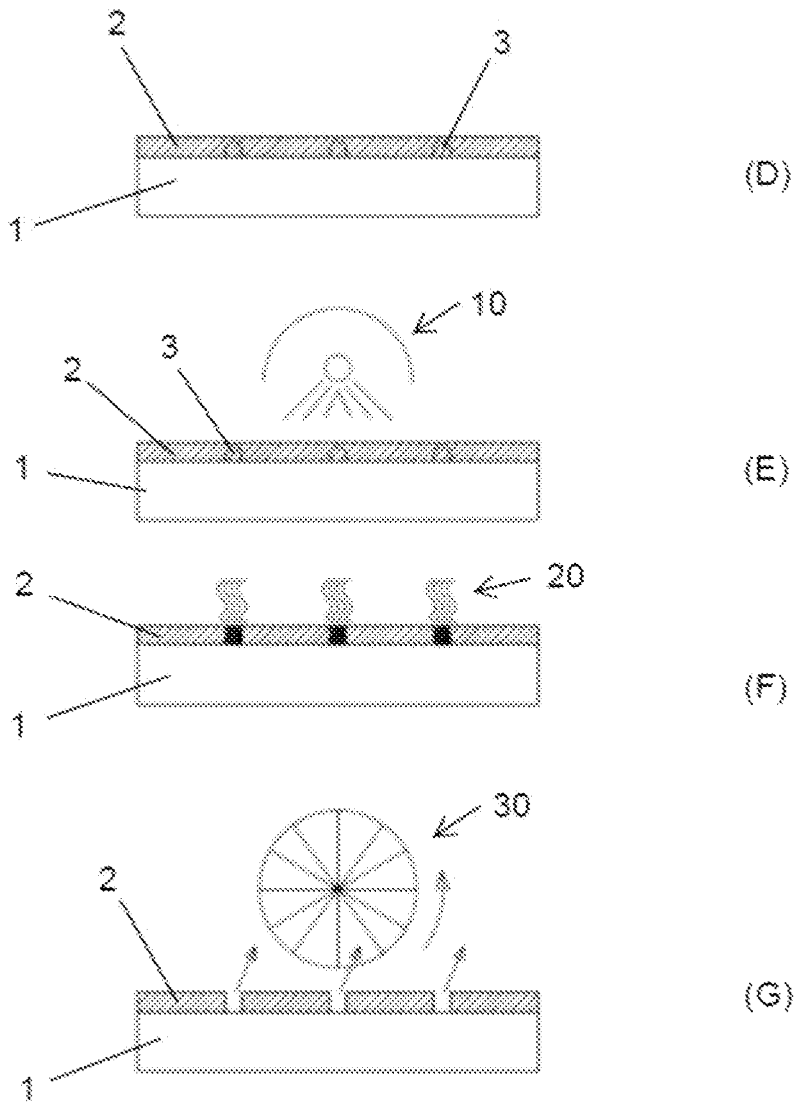
FIG. 6 schematically shows the cross section of a substrate on which a relief is obtained, in steps (D) to (G) according to a second variant of the second embodiment of the method or system of the invention.

According to a second embodiment of the invention shown in FIGS. 4 to 6, the starting point is a substrate (A) on which a relief product (3) is applied (B, C) directly on the substrate (1).

With reference to FIG. 2, in a first variant of the first embodiment shown in FIGS. 1 to 3, there is an impact, immiscibility or displacement of the droplets of the relief product (3) in the coating (2) to produce the relief.

With reference to FIG. 3, in a second variant of the first embodiment shown in FIGS. 1 to 3, there is a mixture or dilution of the droplets of relief product (3) in the coating (2) to produce the relief.

With reference to FIG. 5, in a first variant of the second embodiment shown in FIGS. 4 to 6, there is an impact, immiscibility or displacement of the droplets of the relief product (3) in the coating (2) to produce the relief.

With reference to FIG. 6, in a second variant of the second embodiment shown in FIGS. 4 to 6, there is a mixture or dilution of the droplets of relief product (3) in the coating (2) to produce the relief.

After the coating (2) comes into contact (D) with the relief product (3), the coating (2) and the relief product (3) are cured (E), together or separately, obtaining the solidification of at least the relief product (3). Conventional curing means (10) can be used for curing, such as heating lamps or electromagnetic radiation emission, for example of UV, IR or electron emission light.

Once the relief product (3) has solidified, it is sublimated (F). Conventional sublimation means (20) can be used for sublimation (F), such as by means of heating, in particular, by means of hot air or by means of heating lamps such as, for example, IR heating lamps. It is also envisaged that the sublimation (F) can be performed by reacting the relief product (3) with a sublimation activation product, for example, by applying said sublimation activation product on the relief product (3). The sublimation (F) can be simultaneously carried out, for example, with the solidification of the coating.

Finally, means for removing material (30) can be used to remove (G) coating material in the areas affected by sublimation. These means (30) can be, for example, mechanical means such as brushing or vacuuming, or chemical means such as washing or rinsing of said areas.

Figure 7:
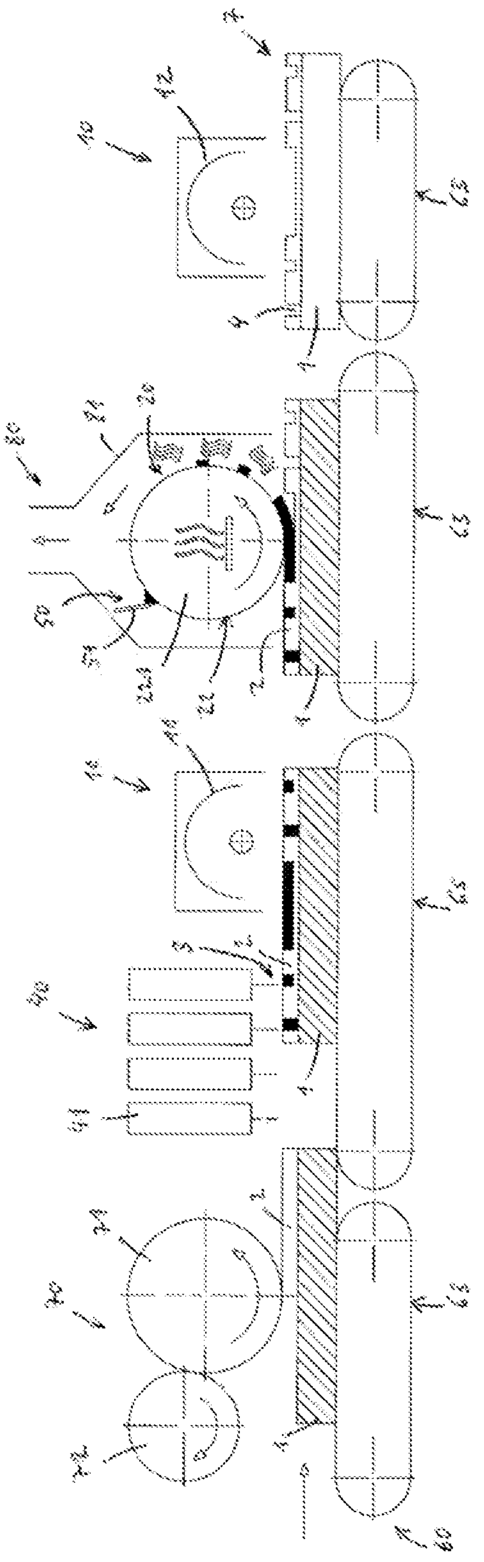
FIG. 7 shows an overview of a first exemplary embodiment of a method and system for producing a relief on a substrate according to the invention, wherein the substrate is in the form of a panel.

FIG. 7 shows a process line according to the first preferred exemplary embodiment of the invention to obtain a relief (7) on a substrate (1) in the form of a panel. The substrate (1) advances through the different steps or stations being transported (60) by means of a conveyor belt (63).

In a first step or station of the process line, a liquid coating (2) is applied on the substrate (1), coating that is made of a UV-curable acrylic, by means of roller (70), using an applicator roller (71) and a dosing roller (72) in a manner known per se. In a subsequent step or station, the relief product (3) is applied on the coating (2) by means of inkjet digital printing (40) using a sublimation ink, which contains the relief product (3) dispersed in a UV-curable acrylic liquid, through injection heads (41) of the sublimation ink.

In this exemplary embodiment, the sublimation ink is applied on the coating (2) while this is still liquid, which facilitates the penetration of the sublimation ink, and therefore of the relief product (3) into the coating (2). In a subsequent step or station of this first exemplary embodiment, the set of the coating (2) and sublimation ink that have been applied partially solidifies (10), being partially cured by means of a UV radiation lamp (11).

Then, in the subsequent step or station, the sublimation (20) of the product of the relief product (3) is carried out. To do this, heat is transferred to the relief product (3) by thermal conduction (22) by means of a heated roller (221) which rolls on the coating (2). This rolling is preferably synchronised with the advance of the substrate (1) along the process line, so that the heated roller (221) rolls substantially without sliding on the coating (2) for sublimating the relief product (3).

During the sublimation (20), sublimation material formed by coating affected by the sublimation of the relief product (3) and/or a residue of relief product (3) is projected on the outer surface of the heated roller (221). This sublimation material is cleaned (50) from the outer surface of the heated roller (221) by means of a scraping blade (51) for scraping the same. The gas from the sublimation of the relief product (3) is extracted (80) by means of an extraction hood (81).

Then, in a final step or station of this first exemplary embodiment, the coating finishes solidifying (10), being cured by means of a UV radiation lamp (12). Afterwards, a step for removing (30) excess material, such as coating affected by the sublimation of the relief product and/or a residue of relief product can be applied, for example, by means of brushing.

Figure 8:
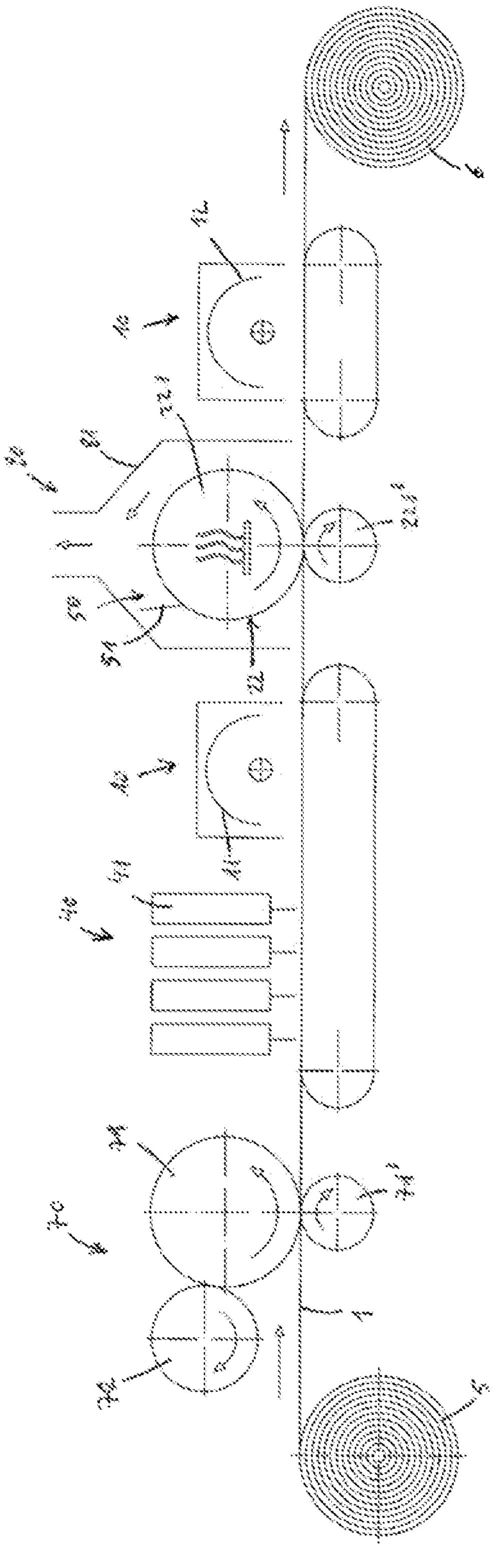
FIG. 8 shows an overview of a second exemplary embodiment of a method and system for producing a relief on a substrate according to the invention, wherein the substrate is in the form of a continuous sheet.

FIG. 8 shows a process line according to the second preferred exemplary embodiment of the invention to obtain a relief (7) on a substrate (1), wherein unlike the first exemplary embodiment, the substrate (1) is in the form of a continuous sheet. The sheet is fed continuously from a feed coil (5) to pass through the different stations or steps of the line until a collection coil (6), wherein the sheet is collected with the relief (7) produced on the substrate (1) for distribution or subsequent processing thereof. The sheet moves along the line by means of guide means, for example, guide rollers, in a manner known per se.

As FIG. 8 shows, the different steps or stations of this second exemplary embodiment are arranged or configured in a similar manner to the stations or steps of the first exemplary embodiment. In the step or station of application of the coating by means of roller (70) a counter roller (71') of the applicator roller of the coating is incorporated, for positioning the substrate (1) by means of a counterpressure with said roller. Likewise, in the step or station of sublimation (20) a counter roller (221') of a heated roller is incorporated for positioning the substrate (1) by means of a counterpressure with said heated roller.

Figure 9:
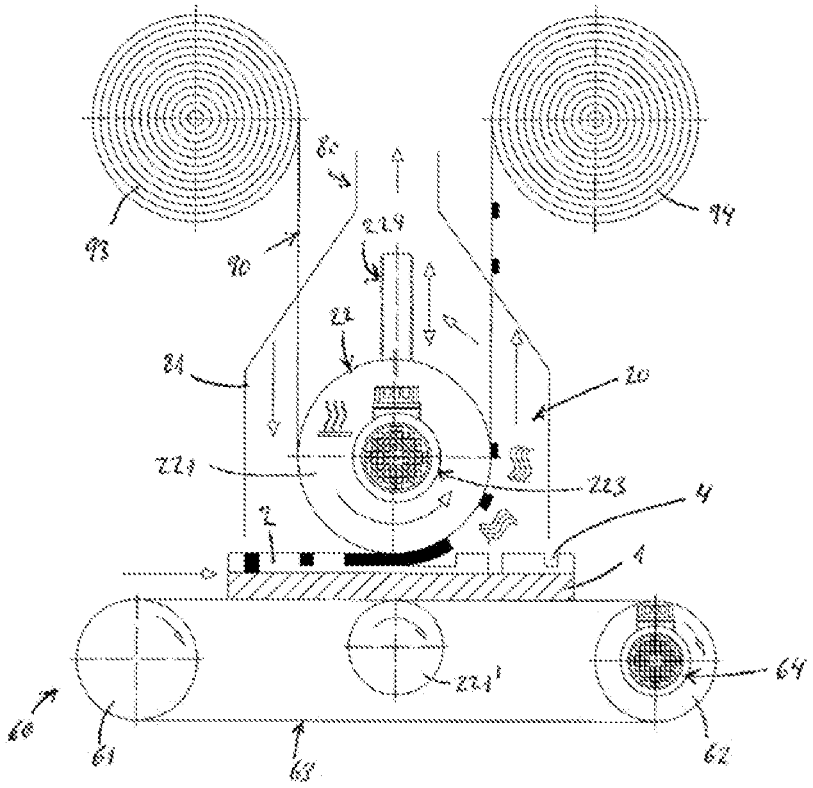
FIG. 9 shows a detailed view of a variant of a sublimation step or station of the method and system according to the invention.

FIG. 9 shows a variant of the sublimation step or station (20), represented for the first exemplary embodiment but which can be similarly applicable to the second exemplary embodiment. In this variant embodiment, unlike the examples shown in FIGS. 7 and 8, during sublimation (20) the sublimation material formed by coating affected by the sublimation of the relief product (3) and/or a residue of relief product (3), instead of directly on the surface of the heated roller (221), is projected onto a sublimation material reception element, in the form of a reception strip (90). The reception strip (90) is fed from a feeding coil (93), being guided as it passes between the heated roller and the coating, until a collection coil (94), in which said sublimation material already deposited is collected for the external processing, recycling or removal thereof.

FIG. 9 also shows other constructive details of the heated roller (221) system. The heated roller (221) is able to move vertically by means of a vertical movement actuator (224) in an adjustable manner to move closer to the coating (2) with the relief product (3) applied therein, in cooperation with the counter roller (221'), for positioning the substrate (1) by exerting a counterpressure with said roller. The heated roller (221) is provided with a rotation actuator (223), to cause the heated roller (221) and the reception strip (90) to rotate on the coating (2) in a manner synchronised with the forward movement of the substrate (1), preferably substantially producing a rolling without sliding, at the same time that the advance of the reception strip (90) trapped between the heated roller (221) and the coating (2) occurs as the sublimation material is transferred to the reception strip (90). For transporting (60) the substrate (1) in the advance thereof, a conveyor belt (63) has been provided that moves guided by guide rollers (61, 62) and driven by means of a rotation actuator (64) which in the represented example acts to rotate one of the guide rollers (62).

Figure 10:
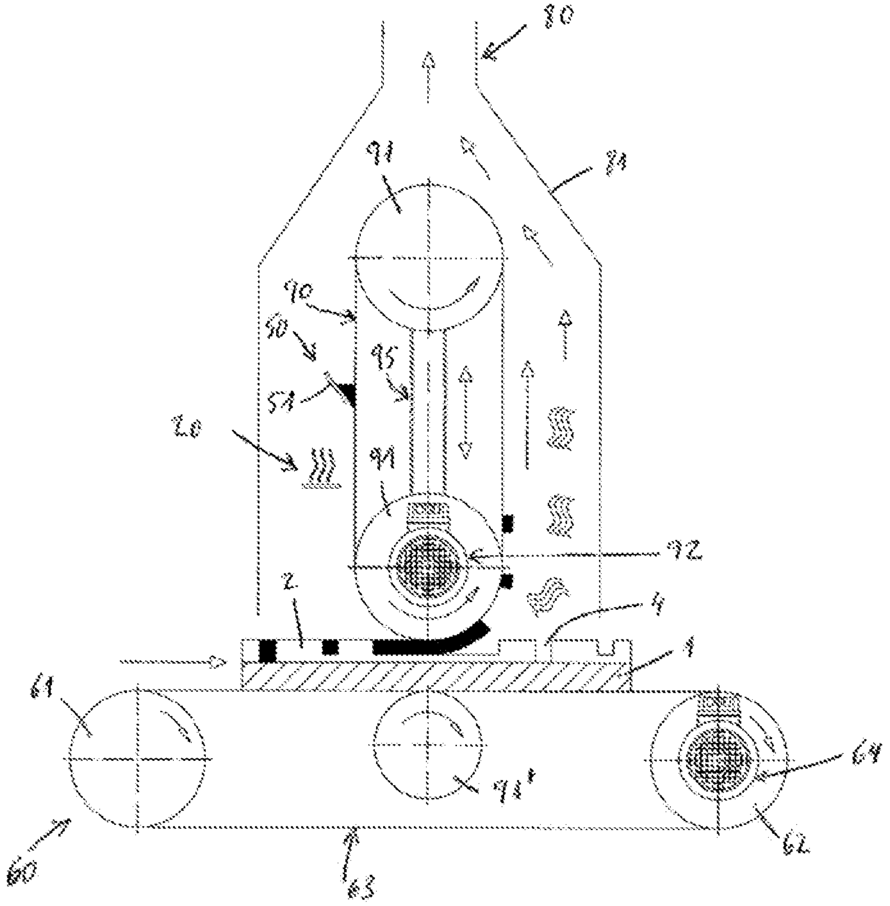
FIG. 10 shows a detailed view of an additional variant of a sublimation step or station of the method and system according to the invention.

FIG. 10 shows another variant of the sublimation step or station (20), equally represented for the first exemplary embodiment but which can be similarly applied to the second exemplary embodiment. In this variant embodiment, unlike the variant shown in FIG. 9, the reception strip (90) is continuously fed in a closed circuit being guided by means of guide rollers (91). The guide rollers (91) can move vertically to adjust the position of the guide roller (91) facing the coating (2) by means of a vertical movement actuator (95), enabling the substrate (1) to advance between this guide roller (91) and a counter roller (91'). The reception strip (90) is moved by means of a rotation actuator (92) that causes, for example, said guide roller (91) facing the coating (2) to rotate.

In the same manner as with the variant shown in FIG. 9, in the variant of FIG. 10 the sublimation material is transferred to the reception strip (90), however, in this variant, the reception strip (90) is refed once it has been cleaned (50) of sublimation material previously deposited on the same. Said cleaning (50) can be carried out, for example, as FIG. 10 shows by means of a scraping blade (51) for scraping the reception strip (90), i.e., the contact surface of the reception strip (90) with the coating (2) when the sublimation material is transferred to the same.

FIG. 10 also shows sublimation means that are alternative or complementary to the heated roller (221) shown in the variants described above. In this variant, the heating to produce the sublimation (20) can be carried out by thermal convection in the area of the guide roller (91) which faces the coating (2) by means of the strip of the reception strip (90). Particularly, the strip (90) can be configured in a material, for example, metal, which facilitates thermal conduction in the coating (2) locally and/or be heated.

Figure 11:
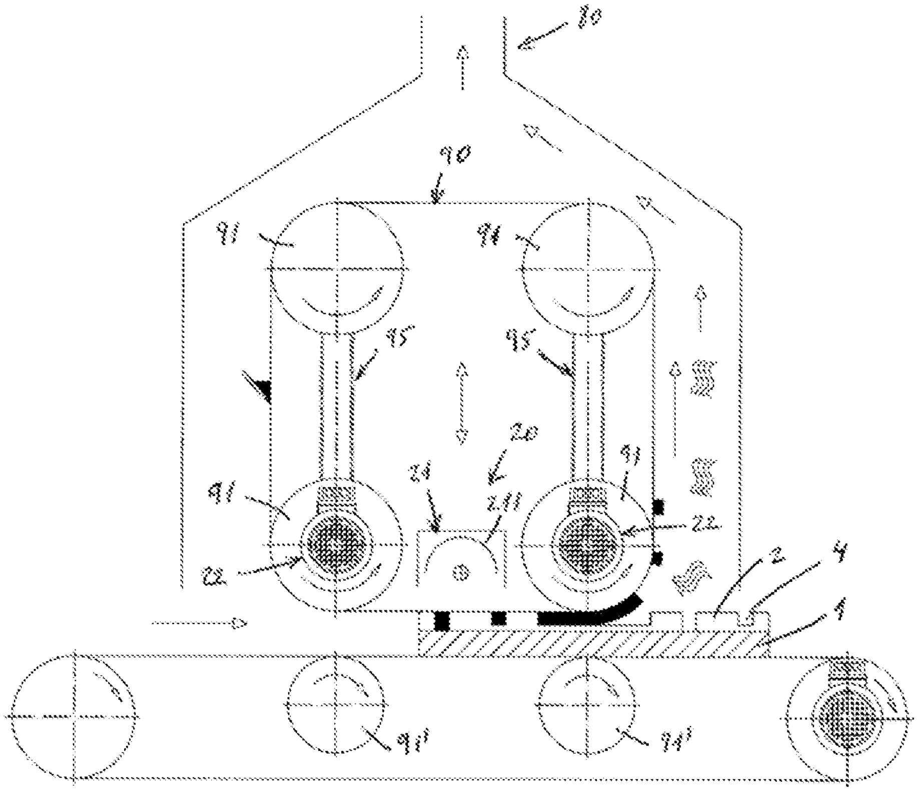
FIG. 11 shows a detailed view of an additional variant of sublimation step or station of the method and system according to the invention.

FIG. 11 shows another variant of the sublimation step or station (20), equally represented for the first exemplary embodiment but which can be similarly applied to the second exemplary embodiment. In this variant embodiment, unlike the variant shown in FIG. 10, the sublimation is carried out by means of radiation heating (21). The heating can be carried out directly towards the coating (2), through a reception strip (90) of sublimation material transparent to the passage of the radiation, or indirectly by heating the reception strip (90).

As can be observed in FIG. 11, the heating (21) is carried out between two guide rollers (91) which are facing the coating (2) in two consecutive positions such that the reception strip (90) continuously remains in contact with the coating (2) between said two positions. This makes it possible to provide a smoothing of the surface of the coating (2) at the same time as the heating (21). Alternatively or complementarily to the heating (21), a partial solidification (10) can be carried out by means of a UV radiation lamp (211) through a reception strip (90) transparent to said radiation. In this manner, a more efficient curing can be achieved, as the amount of air present between the strip (90) and the coating (2) in said area is reduced.

Figure 12:
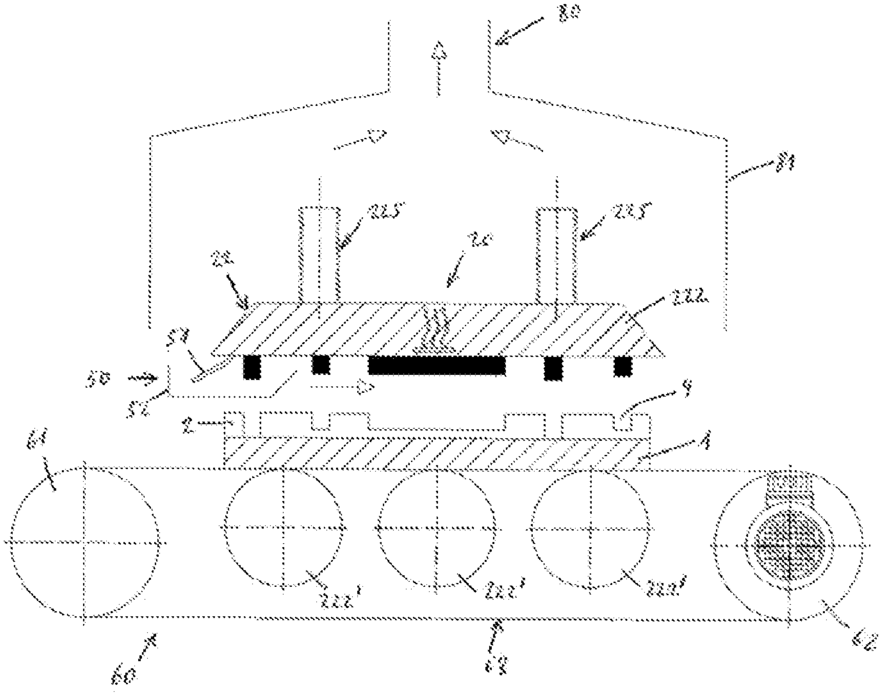
FIG. 12 shows a detailed view of an additional variant of sublimation step or station of the method and system according to the invention.

FIG. 12 shows another variant of the sublimation step or station (20), represented for the first exemplary embodiment but which can be similarly applied to the second exemplary embodiment. In this variant embodiment, unlike the variants described above, the heating of the coating to carry out the sublimation (20) is carried out by means of a thermal conduction element (22) in the form of a heated plate (222). The heated plate (222) can move vertically by means of vertical movement actuators (225) so that, to heat the coating (2) with the relief product (3) and produce the sublimation thereof, the plate (222) faces the coating (2) until making contact with the same, the substrate (1) remaining between the plate (222) and counter rollers (222'). The cleaning (50) of the sublimation material transferred to the plate (222) is carried out by means of the scraping blade (51) that can move horizontally for sweeping said sublimation material, being deposited in a collection tray (52) of said removed material.

Figure 13:
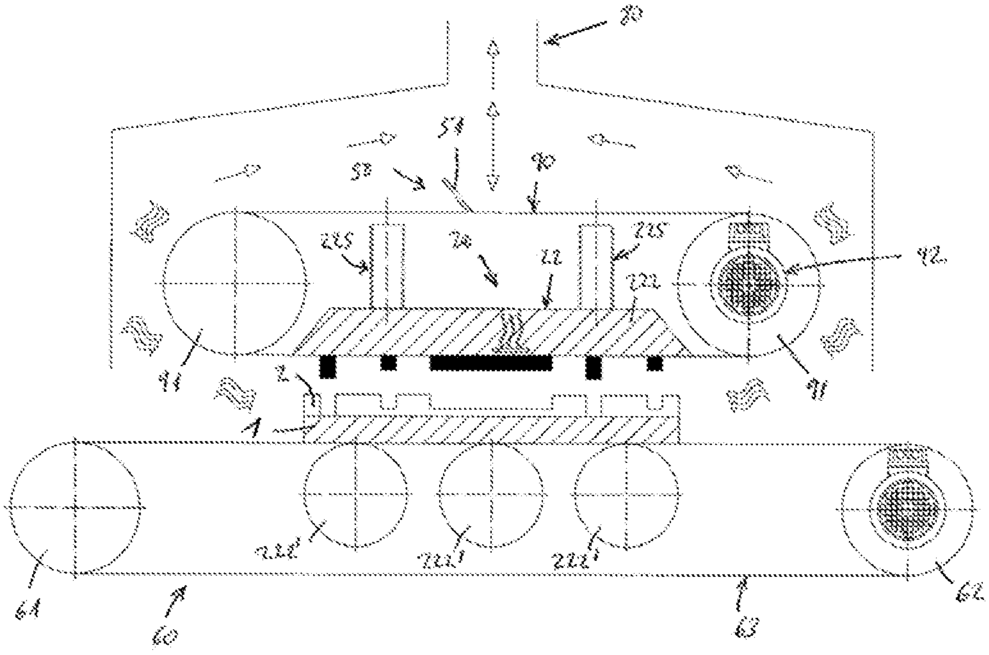
FIG. 13 shows a detailed view of an additional variant of sublimation step or station of the method and system according to the invention.

FIG. 13 shows another variant of the sublimation step or station (20), represented for the first exemplary embodiment but which can be similarly applied to the second exemplary embodiment. In this variant embodiment, unlike the variant shown in FIG. 12, there is a reception strip (90) of sublimation material that is arranged between the plate (222) and the coating (2) to receive the sublimation material from the coating (2). The reception strip (90) is cleaned (50) of said sublimation material by means of a scraping blade (51).

The invention is not limited to the variants represented, but it includes all the variants, modifications and combinations comprised in the scope of the attached claims.

Thus, for example, according to the invention the heating to produce the sublimation (20) can be carried out in a single step or station or in several steps or stations that are successive, consecutive with each other or alternated with other steps or stations of the method. In this sense, it is envisaged that a progressive heating of the coating (2) can be carried out before the sublimation starts, for example, by means of a plurality of conduction heating elements (22), such as heated rollers (221).

Examples of Practical Embodiments

By way of example, Caffeine or Camphor have been used as sublimatable products to obtain a practical embodiment sample with each one of them according to the invention.

We started from a sublimatable product in the form of commercially available powders, these powders have a variety of particle sizes and can even have caked or agglomerated portions due to humidity. This powder was ground to obtain a sublimatable product powder with a particle size (D50) of 2000 Å. Then, said ground sublimatable product was dispersed in a dispersant consisting of an acrylic liquid partially inhibited to UV curing to form a colloidal solution with a sublimatable product concentration of approximately 5% by weight of the sublimation ink, obtaining a sublimation ink that can be used by means of inkjet printing.

The sublimation ink was printed by inkjet, according to a digital template of a relief. Said digital printing was carried out on a liquid coating, of UV-curable acrylic varnish, previously applied on a wood substrate. The printing was carried out by means of printing heads marketed under the trademark Seiko 1536RC (heads with recirculation) as well as with printing heads marketed under the same trademark Seiko 508GS (without recirculation).

Once the sublimation ink was applied, the sample with the applied coating and the relief product was subjected to UV radiation by means of electric arc discharge lamps until partially curing the coating, until having a maximum curing degree of approximately 40% (with respect to the irradiated energy that would be required to completely cure the coating). Next, the sample was heated by subjecting it to an IR radiation by means of IR lamps, until reaching a coating temperature of approximately 160° C. for the samples wherein the sublimatable product was Caffeine or a coating temperature of approximately 150° C. for the samples wherein the sublimatable product was Camphor.

By means of said heating said sublimatable product was sublimated, producing a weakening in the coating in coating areas that determine the relief to be obtained (cavernous areas as a result of the evacuation of gas from the sublimation). Next, the sample was subjected to a final curing for the total solidification thereof.

Finally, brushing was applied on the entire surface of the coating to remove said coating areas that have been weakened by the effect of the sublimation, the corresponding hollows to said areas being exposed once the material is removed from the inside thereof, consisting of coating affected by the sublimation of the sublimatable product and/or a residue of applied sublimation ink, resulting in the relief.

LIST OF REFERENCE SIGNS

1 substrate
2 coating
3 relief product
4 relief hollow
5 substrate feed coil in the form of continuous sheet
6 substrate collection coil in the form of continuous sheet
7 relief obtained
10 solidification means
11 initial curing UV lamp
12 final curing UV lamp
20 sublimation means
21 electromagnetic radiation heating lamp
211 UV heating lamp
22 thermal conduction heating element
30 means for removing coating material
31 vacuum for removing coating material
40 inkjet digital printing means
41 inkjet printing head
50 means for cleaning sublimation material
51 scraping blade
52 collection tray for sublimation material
60 substrate transport means
61 first guide roller for conveyor belt
62 second guide roller for conveyor belt
63 substrate conveyor belt
64 rotation actuator of guide roller for conveyor belt
70 application means of liquid coating
71 applicator roller of liquid coating
71' counter roller of applicator roller
72 dosing roller of liquid coating
80 means for extracting gas from sublimation
81 extraction hood of gas from sublimation
90 reception strip of sublimation material
91 guide roller of reception strip of sublimation material
91' counter roller of guide roller of reception strip
92 rotation actuator of guide roller of reception strip of sublimation material
93 feeding coil of reception strip of sublimation material
94 collection coil of reception strip of sublimation material
95 vertical movement actuator of guide roller
221 thermal conduction heating roller
221' counter roller of heating roller
222 thermal conduction heating plate
222' counter roller of thermal conduction heating plate
223 rotation actuator of heating roller
224 vertical movement actuator of heating roller
225 vertical movement actuator of heating plate

The invention claimed is:

1. A method for producing a relief on a substrate (1), comprising:

applying on a substrate (1) a coating (2) and a relief product (3) that make contact with each other, wherein the relief product (3) is applied by means of digital inkjet printing, wherein the relief product comprises sublimatable solid particles, wherein the sublimatable solid particles are at least partially covered by or embedded in the coating, wherein the sublimatable solid particles are at least partially mixed with the coating, and carrying out sublimation of the sublimatable solid particles of the relief product (3) to leave hollows in the coating (2), corresponding to areas previously occupied by the relief product (3) in contact with the coating (2), the hollows determining the relief.

2. The method for producing a relief on a substrate (1) according to claim 1, wherein the coating (2) is applied on the relief product (3).

3. The method for producing a relief on a substrate (1) according to claim 1, wherein the relief product (3) is applied on the coating (2).

4. The method for producing a relief on a substrate (1) according to claim 1, further comprising after sublimating the relief product, removing the coating affected by the sublimation of the relief product and/or a residue of relief product.

5. The method for producing a relief on a substrate (1) according to claim 1, wherein the relief product (3) is applied in coordination with an image on the substrate (1).

6. The method for producing a relief on a substrate (1) according to claim 1, wherein the relief product (3) is transparent.

7. The method for producing a relief on a substrate (1) according to claim 1, wherein the coating (2) and/or the relief product (3) is applied in liquid form on the substrate (1), wherein the coating (2) and the relief product (3) come into contact with each other when the coating (2) is liquid or partially solidified.

8. The method for producing a relief on a substrate (1) according to claim 1, further comprising solidifying the coating (2).

9. The method for producing a relief on a substrate (1) according to claim 8, wherein the coating (2) an/or the relief product (3) are at least partially solidified before sublimating the relief product (3).

10. The method for producing a relief on a substrate (1) according to claim 8, wherein the solidification of the coating (2) and/or of the relief product (3) is carried out by curing, by means of electromagnetic radiation, more preferably, by UV.

11. The method for producing a relief on a substrate (1) according to claim 8, further comprising solidifying the relief product (3), wherein the coating (2) solidifies later than the relief product (3).

12. The method for producing a relief on a substrate (1) according to claim 1, wherein the relief product and the coating are applied on successive occasions to obtain a plurality of layers of coating and relief product.

13. The method for producing a relief on a substrate (1) according to claim 1, wherein the sublimation of the relief product (3) is carried out by heating.

14. The method for producing a relief on a substrate (1) according to claim 1, wherein the relief product (3) and/or the sublimation ink are miscible in the coating (2).

15. The method for producing a relief on a substrate (1) according to claim 1, wherein the relief product is applied using a sublimation ink, wherein the sublimation ink is a dispersion wherein the dispersed portion comprises the relief product (3).

16. The method for producing a relief on a substrate (1) according to claim 1, wherein the relief product comprises sublimatable solid particles.

17. The method for producing a relief on a substrate (1) according to claim 16, wherein the sublimatable solid particles are a size (D50) smaller than or equal to 2000 Å, smaller or equal than 100 Å, or smaller than or equal to 10 Å.

18. The method for producing a relief on a substrate (1) according to claim 1, wherein the relief product is applied using a sublimation ink, wherein the relief product (3) has a concentration of sublimation ink when being applied less than or equal to 10% by weight, less than or equal to 1% by weight, or less than or equal to 0.1% by weight.

19. The method for producing a relief on a substrate (1) according to claim 1, wherein the relief product is applied using a sublimation ink, wherein the sublimation ink comprises an electromagnetic radiation absorbing agent, configured to substantially absorb electromagnetic radiation energy irradiated in a determined wavelength, electromagnetic radiation for curing the coating (2) and/or the relief product (3), transforming said energy into heat.

20. The method for producing a relief on a substrate (1) according to claim 19, wherein the electromagnetic radiation absorbing agent is of UV absorbing agent selected from the group consisting of benzophenones, benzotriazoles, triazines, oxanilides and cyanoacrylates.

21. The method for producing a relief on a substrate (1) according to claim 1, wherein the relief product is applied using a sublimation ink, wherein the sublimation ink comprises an exothermic chemical reaction promoting agent, configured to react in the coating (2) by releasing heat.

22. The method for producing a relief on a substrate (1) according to claim 1, wherein the relief product is applied using a sublimation ink, wherein the sublimation ink comprises an odoriferous agent configured to impart odour to the coating (2) when activated by heating.

23. The method for producing a relief on a substrate (1) according to claim 1, further comprising solidifying the relief product (3).

24. The method for producing a relief on a substrate (1) according to claim 1, wherein the sublimation of the relief product (3) is carried out by means of a source of electromagnetic radiation.

25. The method for producing a relief on a substrate (1) according to claim 1, wherein the sublimation of the relief product (3) is carried out by means of IR.

26. The method for producing a relief on a substrate (1) according to claim 1, wherein the sublimation of the relief product (3) is carried out by heating by means of a thermal convection element.

27. The method for producing a relief on a substrate (1) according to claim 1, wherein the sublimation of the relief product (3) is carried out by means of heated air.

28. The method for producing a relief on a substrate (1) according to claim 1, wherein the sublimation of the relief product (3) is carried out by heating by means of a thermal conduction heating element.

29. The method for producing a relief on a substrate (1) according to claim 1, wherein the coating (2) is applied in liquid form on the substrate (1).

30. A method for producing a relief on a substrate (1), the method comprising:

applying on the substrate (1) a coating (2) and a relief product (3) that make contact with each other, wherein the relief product (3) is applied by means of digital inkjet printing, wherein the relief product is at least partially covered by or embedded in the coating, wherein the relief product (3) is at least partially mixed with the coating, and solidifying the relief product (3), and carrying out the sublimation of the relief product (3) to leave hollows in the coating (2), corresponding to areas previously occupied by the relief product (3) in contact with the coating (2), the hollows determining the relief.

31. A system for producing a relief on a substrate (1), which comprises means for applying (70) a coating on the substrate (1), means for applying (40) a relief product (3), means for sublimating (20) the relief product (3), and means for controlling the means for applying the coating (2), the means for applying the relief product (3) and the means for sublimating the relief product (3), configured to carry out a method according to claim 1.

32. The system for producing a relief on a substrate (1), according to claim 31, wherein the means for sublimating (20) the relief product (3) comprise at least one electromagnetic radiation heating lamp (21), at least one convection heating element, and/or at least one thermal conduction heating element (22).

33. The system for producing a relief on a substrate (1), according to claim 31, comprising a sublimation material reception strip (90) that faces the coating (2) so that, when the relief product (3) is sublimated, sublimation material formed by coating affected by the sublimation of the relief product (3) and/or a residue of the relief product (3) is projected onto the reception strip.

34. The system for producing a relief on a substrate (1), according to claim 32, comprising means for cleaning (50) a surface of the thermal conduction heating element (22) or of the reception strip (90) on which the sublimation material is projected, comprising a scraping blade (51) for scraping said surface or strip.

35. The system for producing a relief on a substrate (1), according to claim 32, comprising means for removing (30) from the coating (2) sublimation material formed by coating affected by the sublimation of the relief product (3) and/or a residue of relief product (3), in the form of at least one brush, at least one vacuum (31) and/or at least one blower.

36. The system for producing a relief on a substrate (1), according to claim 31, comprising means for extracting (80) gas from the sublimation of the relief product (3), in the form of a gas extraction hood (81), and/or solidification means (10) for at least partially solidifying the coating (2) and/or the relief product (3), and/or substrate transport means (60) for transporting the substrate (1) while carrying out the method.

* * * * *